(12) United States Patent  (10) Patent No.: US 9,513,508 B2
Lee  (45) Date of Patent: Dec. 6, 2016

(54) BACKLIGHT UNIT AND LIQUID CRYSTAL DISPLAY DEVICE INCLUDING THE SAME

(71) Applicant: LG DISPLAY CO., LTD., Seoul (KR)

(72) Inventor: Jung Hyun Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/328,489

(22) Filed: Jul. 10, 2014

(65) Prior Publication Data

US 2015/0085222 A1   Mar. 26, 2015

(30) Foreign Application Priority Data

Sep. 25, 2013  (KR) .................. 10-2013-0114161

(51) Int. Cl.
*G02F 1/1335* (2006.01)
*F21V 8/00* (2006.01)

(52) U.S. Cl.
CPC ....... *G02F 1/133615* (2013.01); *G02B 6/0031* (2013.01); *G02B 6/0088* (2013.01); *G02F 1/133605* (2013.01)

(58) Field of Classification Search
CPC .............. G02F 1/133615; G02F 1/133605; G02B 6/0013; G02B 6/42; G02B 6/0031; G02B 6/0088
USPC ......................................... 349/65
See application file for complete search history.

(56) References Cited

U.S. PATENT DOCUMENTS

| | | | |
|---|---|---|---|
| 2003/0223020 A1* | 12/2003 | Lee | ................................ 349/58 |
| 2005/0068473 A1* | 3/2005 | Kim | .................... G02B 6/0018 349/65 |
| 2008/0204624 A1 | 8/2008 | Fu | |
| 2012/0230008 A1* | 9/2012 | Ajichi | ............... G02F 1/133536 362/19 |

FOREIGN PATENT DOCUMENTS

| | | |
|---|---|---|
| CN | 1461965 A | 12/2003 |
| CN | 101266354 A | 9/2008 |
| CN | 102597603 A | 7/2012 |

* cited by examiner

*Primary Examiner* — Nathanael R Briggs
*Assistant Examiner* — William Peterson
(74) *Attorney, Agent, or Firm* — Birch, Stewart, Kolasch & Birch, LLP

(57) ABSTRACT

Discussed are a backlight unit and an LCD device including the same. The backlight unit includes a light guide panel, a light source part disposed at a side of the light guide panel to emit the light, an optical sheet disposed at a front surface of the light guide panel to change a traveling direction of the light to a direction vertical to the light guide panel, a guide panel separated from an end of the optical sheet, and configured to guide the light guide panel, the light source part, and the optical sheet, a reflector disposed at a rear surface of the light guide panel to reflect the light toward the front surface of the light guide panel, a side reflector adhered to a side of the light guide panel, and a cover bottom coupled to the guide panel and in which the reflector is disposed.

11 Claims, 8 Drawing Sheets

BACKLIGHT UNIT AND LIQUID CRYSTAL DISPLAY DEVICE INCLUDING THE SAME

CROSS-REFERENCE TO RELATED APPLICATIONS

This application claims the priority benefit of the Korean Patent Application No. 10-2013-0114161 filed on Sep. 25, 2013, which is hereby incorporated by reference as if fully set forth herein.

BACKGROUND

Field of the Invention

The present invention relates to a backlight unit, and more particularly, to a backlight unit including a light source mounted on a side of a liquid crystal panel and a liquid crystal display (LCD) device including the same.

Discussion of the Related Art

A flat panel display (FPD) device is applied to various electronic devices such as portable phones, tablet personal computers (PCs), notebook computers, monitors, etc. Examples of the FPD device include liquid crystal display (LCD) devices, plasma display panel (PDP) devices, organic light emitting display devices, etc. Recently, electrophoretic display (EPD) devices are being widely used as one type of the FPD device.

In such FPD devices (hereinafter simply referred to as a display device), the LCD devices are being the most widely commercialized at present because the LCD devices are easily manufactured due to the advance of manufacturing technology and realize a drivability of a driver and a high-quality image.

Since the LCD devices are not self-emitting devices, the LCD devices include a backlight unit provided under a liquid crystal panel, and display an image by using light emitted from the backlight unit.

The LCD devices are categorized into an edge type and a direct type depending on an arrangement of a light source configuring the backlight unit.

FIG. 1 is an exemplary view illustrating a cross-sectional surface of a related art edge type LCD device, and FIG. 2 is an exemplary view illustrating a cross-sectional surface of a related art slim type LCD device. FIG. 3 is an exemplary view illustrating a periphery of a catching part in which light is leaked, in an optical sheet applied to the related art slim type LCD device, and is an exemplary view illustrating an optical sheet applied to the LCD device of FIG. 2.

As described above, LCD devices are categorized into the edge type, in which a light source is mounted on a side of a liquid crystal panel, and the direct type in which the light source is mounted on a bottom of the liquid crystal panel. In FIGS. 1 and 2, the related art edge type LCD device is illustrated.

As illustrated in FIG. 1, the related art edge type LCD device includes a guide panel 14, a light guide panel 12, a light source (not shown), an optical sheet 13, a cover bottom 16, a reflector 17, a liquid crystal panel 11, and a top case 15.

The liquid crystal panel 11 includes a lower substrate, an upper substrate, and a liquid crystal layer formed between the lower substrate and the upper substrate. An upper polarizing film is adhered to an upper end surface of the upper substrate, and a lower polarizing film is adhered to a lower end surface of the lower substrate. The liquid crystal panel 11 is disposed on the guide panel 14, and the optical sheet 13 is disposed under the liquid crystal panel 11.

The liquid crystal panel 11 is disposed at the guide panel 14. The guide panel 14 guides the light guide panel 15, the light source (not shown), and the optical sheet 13. In particular, the guide panel 14 covers an end of the optical sheet 13.

The optical sheet 13 transfers light, which is emitted from the light source (not shown) and travels toward the guide panel 14 through the light guide panel 12, in a direction vertical to a bottom of the liquid crystal panel 11.

The light guide panel 12 transfers the light, which is emitted and is incident from the light source (not shown), toward the liquid crystal panel 11.

The reflector 17 is adhered to a bottom of the light guide panel 12, and a side reflector 17a is adhered to a side of the light guide panel 12. Therefore, the light which reaches the bottom and side of the light guide panel 12 may be reflected toward the liquid crystal panel 11 by the reflector 17 and the side reflector 17a.

The light source (not shown) may use a light emitting diode (LED).

In the related art edge type LCD device, as described above, the end of the optical sheet 13 is covered by the guide panel 14. That is, there is no gap between the guide panel 14 and the optical sheet 13. Therefore, the light is not leaked between guide panel 14 and the optical sheet 13, and thus, a quality of an image displayed by the LCD device is good.

However, in the related art slim type LCD device of FIG. 2 developed for a slim structure, the guide panel 24 is separated from the end of the optical sheet 23 by a certain interval.

As illustrated in FIG. 2, the related art slim type LCD device includes a cover bottom 26, a reflector 27, a light guide panel 22, an optical sheet 23, a panel 21, a guide panel 24, and a tempered glass 28. The optical sheet 23 is separated from the guide panel 24 by a certain interval.

Therefore, some of light (which is reflected by a pattern formed in the light guide panel 22, the reflector 27, or a side reflector 27a adhered to a side of the light guide panel 22) is leaked through a gap between the optical sheet 23 and the guide panel 24, and for this reason, a quality of an image displayed by the LCD device is degraded.

In particular, as illustrated in FIG. 3, light leakage or light bounce severely occurs at a periphery A of a catching part 23a of the optical sheet 23.

The catching part 23a is provided as at least two or more at the optical sheet 23 in order for the optical sheet 23 to be fixed to an inner side of the guide panel 24 and the cover bottom 26. The catching part 23a is caught on a catching jaw 29 which is formed at the cover bottom 26 or the guide panel 24, and thus, the optical sheet 23 is fixed to the inner side of the guide panel 24 and the cover bottom 26.

As described above, in the related art slim type LCD device, light leakage or light bounce occurs through the gap between the optical sheet 23 and the guide panel 24, and severely occurs at the periphery A of the catching part 23a which is formed at the optical sheet 23. Nevertheless, the related art LCD device does not include a structure which prevents the light leakage or the light bounce.

SUMMARY

Accordingly, the present invention is directed to providing a backlight unit and a liquid crystal display (LCD) device including the same that substantially obviate one or more problems due to limitations and disadvantages of the related art.

An aspect of the present invention is directed to providing a backlight unit, which can prevent light from being leaked or bouncing through a gap between a guide panel and an optical sheet, and an LCD device including the same.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a backlight unit including: a light guide panel; a light source part disposed at a side of the light guide panel to emit the light; an optical sheet disposed at a front surface of the light guide panel to change a traveling direction of the light, transferred from the light guide panel, to a direction vertical to the light guide panel; a guide panel separated from an end of the optical sheet, and configured to guide the light guide panel, the light source part, and the optical sheet; a reflector disposed at a rear surface of the light guide panel to reflect the light, transferred through the light guide panel, toward the front surface of the light guide panel; a side reflector adhered to a side of the light guide panel; and a cover bottom coupled to the guide panel, and in which the reflector is disposed, wherein a catching part light absorbing material is coated on a catching part which is formed at the optical sheet.

In another aspect of the present invention, there is provided a backlight unit including: a light guide panel; a light source part disposed at a side of the light guide panel to emit the light; an optical sheet disposed at a front surface of the light guide panel to change a traveling direction of the light, transferred from the light guide panel, to a direction vertical to the light guide panel; a guide panel separated from an end of the optical sheet, and configured to guide the light guide panel, the light source part, and the optical sheet; a reflector disposed at a rear surface of the light guide panel to reflect the light, transferred through the light guide panel, toward the front surface of the light guide panel; a side reflector adhered to a side of the light guide panel; and a cover bottom coupled to the guide panel, and in which the reflector is disposed, wherein a region of the side reflector, corresponding to a catching part formed at the optical sheet, is cut.

In another aspect of the present invention, there is provided a backlight unit including: a light guide panel; a light source part disposed at a side of the light guide panel to emit the light; an optical sheet disposed at a front surface of the light guide panel to change a traveling direction of the light, transferred from the light guide panel, to a direction vertical to the light guide panel; a guide panel separated from an end of the optical sheet, and configured to guide the light guide panel, the light source part, and the optical sheet; a reflector disposed at a rear surface of the light guide panel to reflect the light, transferred through the light guide panel, toward the front surface of the light guide panel, wherein a reflector light absorbing material is coated on a region of the reflector corresponding to a gap between the guide panel and the optical sheet; a side reflector adhered to a side of the light guide panel; and a cover bottom coupled to the guide panel, and in which the reflector is disposed.

In another aspect of the present invention, there is provided a liquid crystal display (LCD) device including: a backlight; a liquid crystal panel disposed on the backlight unit to display an image; and a tempered glass adhered to a front surface of the liquid crystal panel, wherein the backlight unit includes: a light guide panel; a light source part disposed at a side of the light guide panel to emit the light; an optical sheet disposed at a front surface of the light guide panel to change a traveling direction of the light, transferred from the light guide panel, to a direction vertical to the light guide panel; a guide panel separated from an end of the optical sheet, and configured to guide the light guide panel, the light source part, and the optical sheet; a reflector disposed at a rear surface of the light guide panel to reflect the light, transferred through the light guide panel, toward the front surface of the light guide panel; a side reflector adhered to a side of the light guide panel; and a cover bottom coupled to the guide panel, and in which the reflector is disposed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 1:
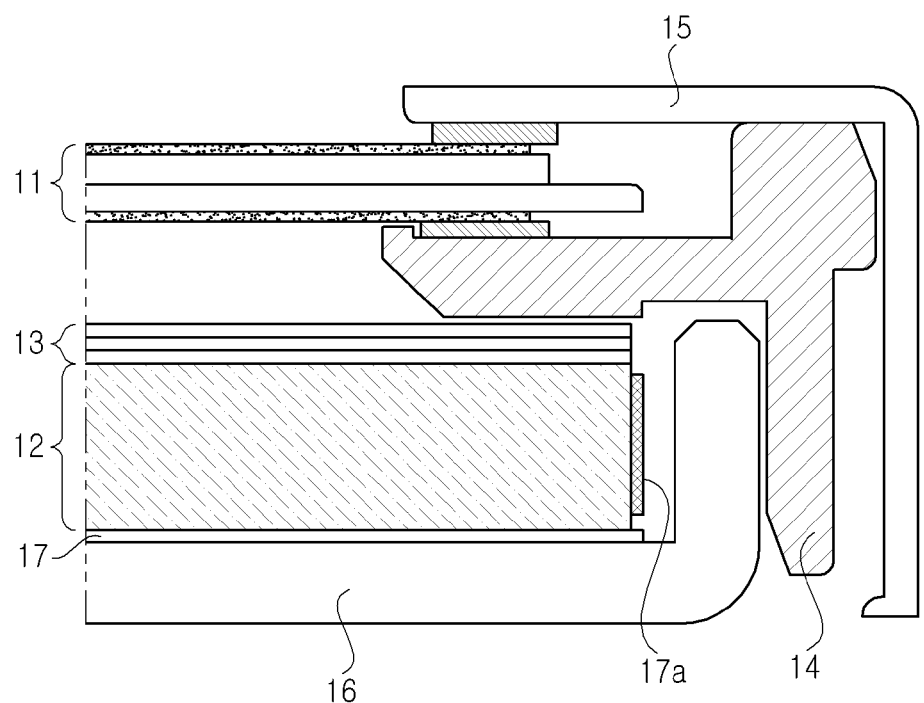
FIG. 1 is an exemplary view illustrating a cross-sectional surface of a related art edge type LCD device.
Figure 2:
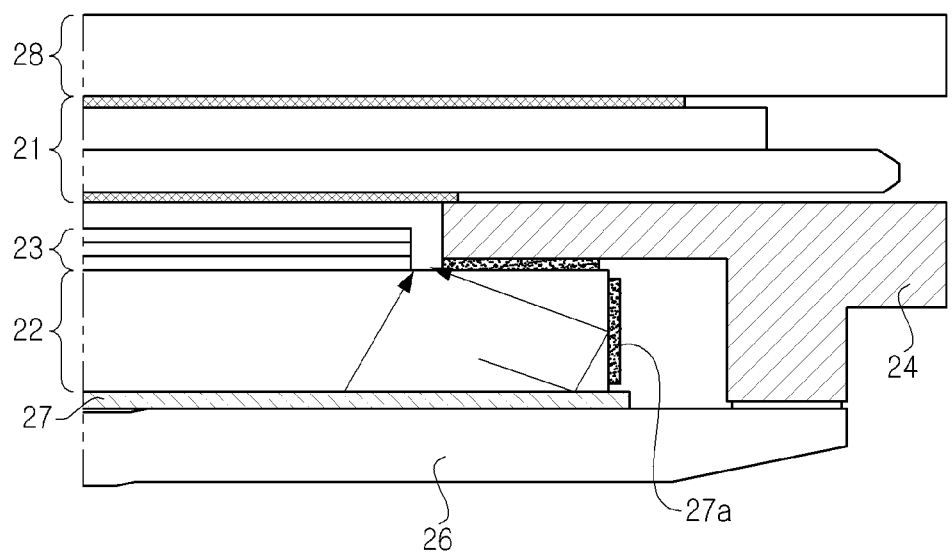
FIG. 2 is an exemplary view illustrating a cross-sectional surface of a related art slim type LCD device.
Figure 3:
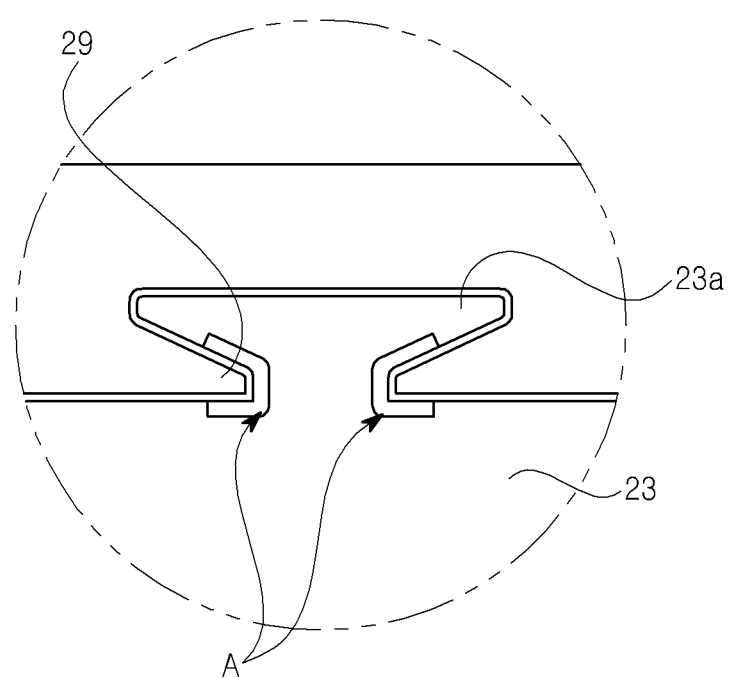
FIG. 3 is an exemplary view illustrating a periphery of a catching part in which light is leaked, in an optical sheet applied to the related art slim type LCD device.
Figure 4:
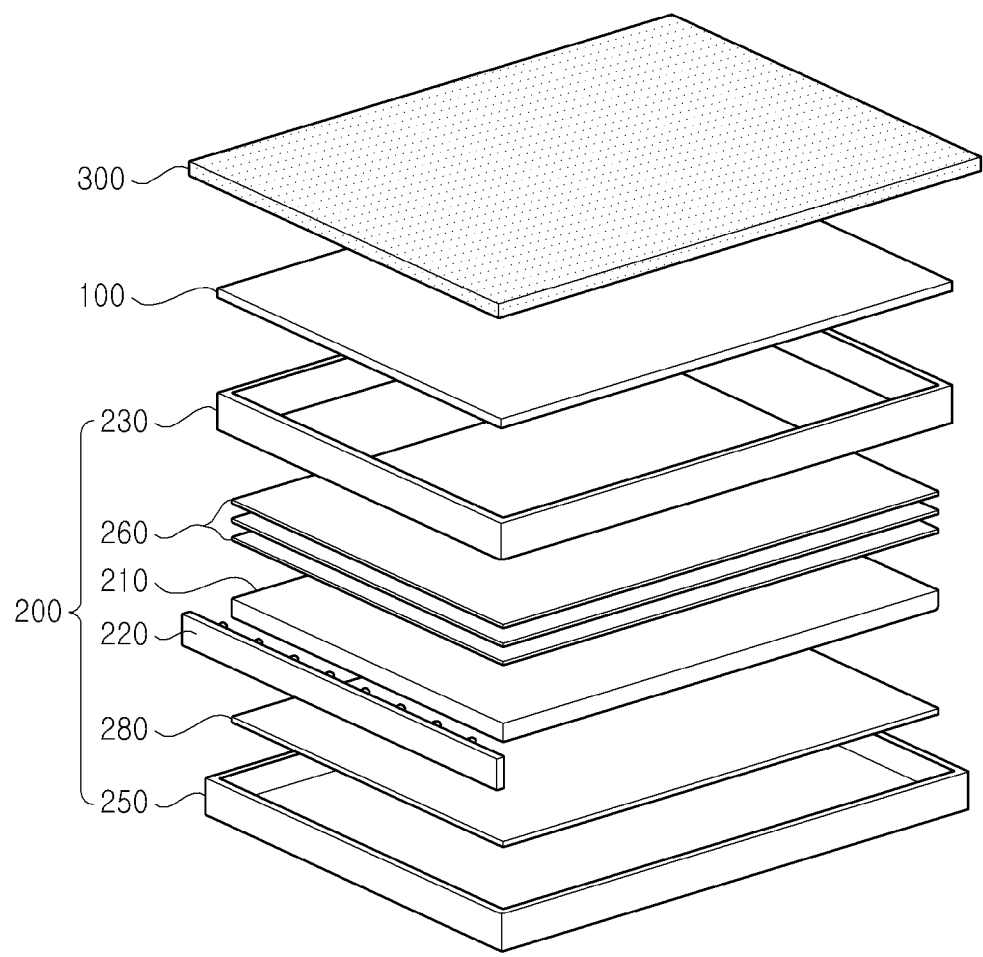
FIG. 4 is an exploded perspective view schematically illustrating a structure of an LCD device according to an embodiment of the present invention.

FIG. 4 is an exploded perspective view schematically illustrating a structure of an LCD device according to an embodiment of the present invention.

As illustrated in FIG. 4, the LCD device according to an embodiment of the present invention includes a backlight unit 200, a liquid crystal panel 100 which is disposed on the backlight unit 200 to display an image, and a tempered glass 300 which is adhered to a front surface of the liquid crystal panel 100. All the components of the LCD device are operatively coupled and configured.

The liquid crystal panel 100 includes a plurality of pixels respectively formed in a plurality of areas defined by intersections between a plurality of gate lines and a plurality of data lines which are formed in a display area. A thin film transistor (TFT) is formed in each of the plurality of pixels.

The TFT supplies a data voltage, supplied from a corresponding data line, to a pixel electrode in response to a scan signal supplied from a corresponding gate line. In response to the data voltage, the pixel electrode drives liquid crystal which is disposed between the pixel electrode and a common electrode, thereby adjusting a light transmittance.

The liquid crystal panel may be driven in an in-plane switching (IPS) mode or a twisted nematic (TN) mode.

In the liquid crystal panel 100 which is driven in the IPS mode, the pixel electrode and the common electrode are disposed on a lower substrate configuring the liquid crystal panel 100, and an alignment of the liquid crystal is adjusted by a lateral electric field generated between the pixel electrode and the common electrode.

The liquid crystal panel 100 includes the lower substrate, an upper substrate, and a liquid crystal layer which is formed between the lower substrate and the upper substrate and into which the liquid crystal is charged. A lower polarizing film is adhered to a rear surface of the lower substrate, and an upper polarizing film is adhered to a front surface of the upper substrate.

The lower polarizing film and the upper polarizing film are adhered to a rear surface or front surface of the liquid crystal panel 100, and transmit only a specific-direction component among components of light which is transferred through a light guide panel 210.

To provide an additional description, the liquid crystal panel 100 drives the liquid crystal, which is injected between the upper substrate and the lower substrate, with a voltage applied to the upper substrate or the lower substrate to control a transmission amount of the light which is emitted from a light source part 220 configuring the backlight unit 200 and transferred through the light guide panel 210, thereby displaying an image.

The tempered glass 300 is adhered to a front surface of the liquid crystal panel 100, and protects the liquid crystal panel 100.

In the LCD device according to an embodiment of the present invention, the tempered glass 300 covers the liquid crystal panel 100, and thus, a step height is not formed at the front surface of the LCD device.

According to an embodiment of the present invention, a top case is not needed, and thus, an LCD device having a high-performance slim structure may be manufactured.

The present invention provides a slim type LCD device in which the liquid crystal panel 100 is adhered to a guide panel 230 configuring the backlight unit 200, and the tempered glass 300 is adhered to the front surface of the liquid crystal panel 100.

The backlight unit 200 irradiates the light onto the liquid crystal panel 100. To this end, the backlight unit 200 includes: the light guide panel 210; the light source part 220 that is disposed at a side of the light guide panel 210 to emit the light; an optical sheet 260 that is disposed at a front surface of the light guide panel 210 to change a traveling direction of the light, transferred from the light guide panel 210, to a direction vertical to the light guide panel 210; the guide panel 230 that is separated from an end of the optical sheet 260, and guides the light guide panel 210, the light source part 220, and the optical sheet 260; a reflector 280 that is disposed at a rear surface of the light guide panel 210 to reflect the light, transferred through the light guide panel 210, toward the front surface of the light guide panel 210; and a cover bottom 250 that is coupled to the guide panel 230 and a side reflector (not shown) adhered to a side of the light guide panel 210, and in which the reflector 280 is disposed.

First, the light guide panel 210 scatters and reflects the light which is emitted from the light source part 220 and is incident through the side of the light guide panel 210, thereby transmitting the light to optical sheet 260 which is disposed on the light guide panel 210.

The light guide panel 210 may be formed of a material such as resin or plastic such as polymethylmethacrylate (PMMA). The light guide panel 210 is guided by the guide panel 230, and is mounted on the cover bottom 250. Various types of patterns for scattering and reflecting the light toward the optical sheet 260 may be formed at a bottom of the light guide panel 210.

Second, the reflector 280 is disposed at the rear surface of the light guide panel 210, and reflects the light (which is emitted from the light source part 220, is input to the light guide panel 210 through the side of the light guide panel 210, and travels toward the rear surface of the light guide panel 210) toward the liquid crystal panel 100.

The light, which is emitted from the light source part 220 and input to the light guide panel 210, is refracted by a pattern formed at the light guide panel 210, and is reflected toward the liquid crystal panel 100. However, some of the light may be leaked to the outside through the rear surface of the light guide panel 210 without being reflected, and thus, the reflector 280 reflects the leaked light to induce the leaked light toward the liquid crystal panel 100.

The reflector 280 may be guided by the guide panel 230 or the cover bottom 250, and mounted on the cover bottom 250.

Third, the light source part 220 irradiates the light onto the liquid crystal panel 100 through the light guide panel 210, and may include a light source and a printed circuit board (PCB) that supports the light source.

The light source may be configured with one or more LED packages each including an LED. For example, one of a blue LED emitting blue light, a green LED emitting green light, and a red LED emitting red light may be mounted on the LED package. In this case, the LED package may include a phosphor material that converts the blue light, green light, or red light into white light. However, instead of the phosphor material forming the LED package, a film including the phosphor material may be disposed between the LED package and the light guide panel 210 or between the light guide panel 210 and the liquid crystal panel 100.

The PCB supports the light source, and a plurality of circuits connected to the light source are provided at the PCB.

Fourth, the optical sheet 260 diffuses the light passing through the light guide panel 210, or allows the light, passing through the light guide panel, to be vertically incident on the liquid crystal panel 100. The optical sheet 260 may include a diffuser sheet and a prism sheet.

The optical sheet 260 is disposed at the front surface of the light guide panel 210 to change a traveling direction of the light, transferred from the light guide panel 210, to a direction vertical to the light guide panel 210.

In particular, the end of the optical sheet 260 is disposed on the light guide panel 210 to be separated from the guide panel 230 by a certain interval. The end of the optical sheet 260 is not covered by the guide panel 230, and is disposed at the front surface of the light guide panel 210 to be separated from an end of the guide panel 230 by a certain interval.

Fifth, the reflector 280, the light guide panel 210, the optical sheet 260, and the liquid crystal panel 100 are sequentially stacked on the cover bottom 250. The cover bottom 250 is coupled to the guide panel 30, and accommodates the elements.

Sixth, the guide panel 230 guides the light guide panel 210 and the optical sheet 260, and supports the liquid crystal panel 100.

The guide panel 230 is disposed at the cover bottom 250. The reflector 280, the light source part 220, the light guide panel 210, and the optical sheet 260 which are disposed in the guide panel 230 may be respectively guided by sides of the guide panel 230, and may be respectively fixed to certain positions.

In particular, as described above, the guide panel 230 does not cover the end of the optical sheet 260, and is disposed at the bottom of the light guide panel 210 to be separated from the end of the optical sheet 260 by a certain interval.

Moreover, although not shown, the side reflector for reflecting the light (transferred toward the side of the light guide panel 210) toward the inside of the light guide panel 210 may be adhered to each of three sides except a side (which faces the light source part 220) among four sides of the light guide panel 210.

The LCD device according to an embodiment of the present invention improves the quality of an image displayed by the LCD device, and improves the image quality of a non-uniform screen end, and particularly, image qualities of left and right corners of a screen of the LCD device.

In the related art LCD device having a high-performance slim structure, an end of an optical sheet is not covered by a guide panel, and thus, non-uniform light bounce or light leakage occurs at the end of the optical sheet.

In contrast, the present invention prevents the light leakage or the light bounce, and uses the following three methods.

In the first method, the light bounce or the light leakage can be prevented by using a catching part light absorbing material coated on the optical sheet 260.

In the second method, the light bounce or the light leakage can be prevented by cutting a portion of the side reflector adhered to the side of the light guide panel 210.

In the third method, the light bounce or the light leakage can be prevented by coating a reflector light absorbing material on an outer portion of the reflector 280 disposed at the rear surface of the light guide panel 210.

Moreover, the light bounce or the light leakage can be prevented by combining two of the three methods.

Hereinafter, a backlight unit of an LCD device according to an embodiment of the present invention for preventing the light bounce or the light leakage by using the three methods will be described in detail with reference to FIGS. 4 to 8.

Figure 5:
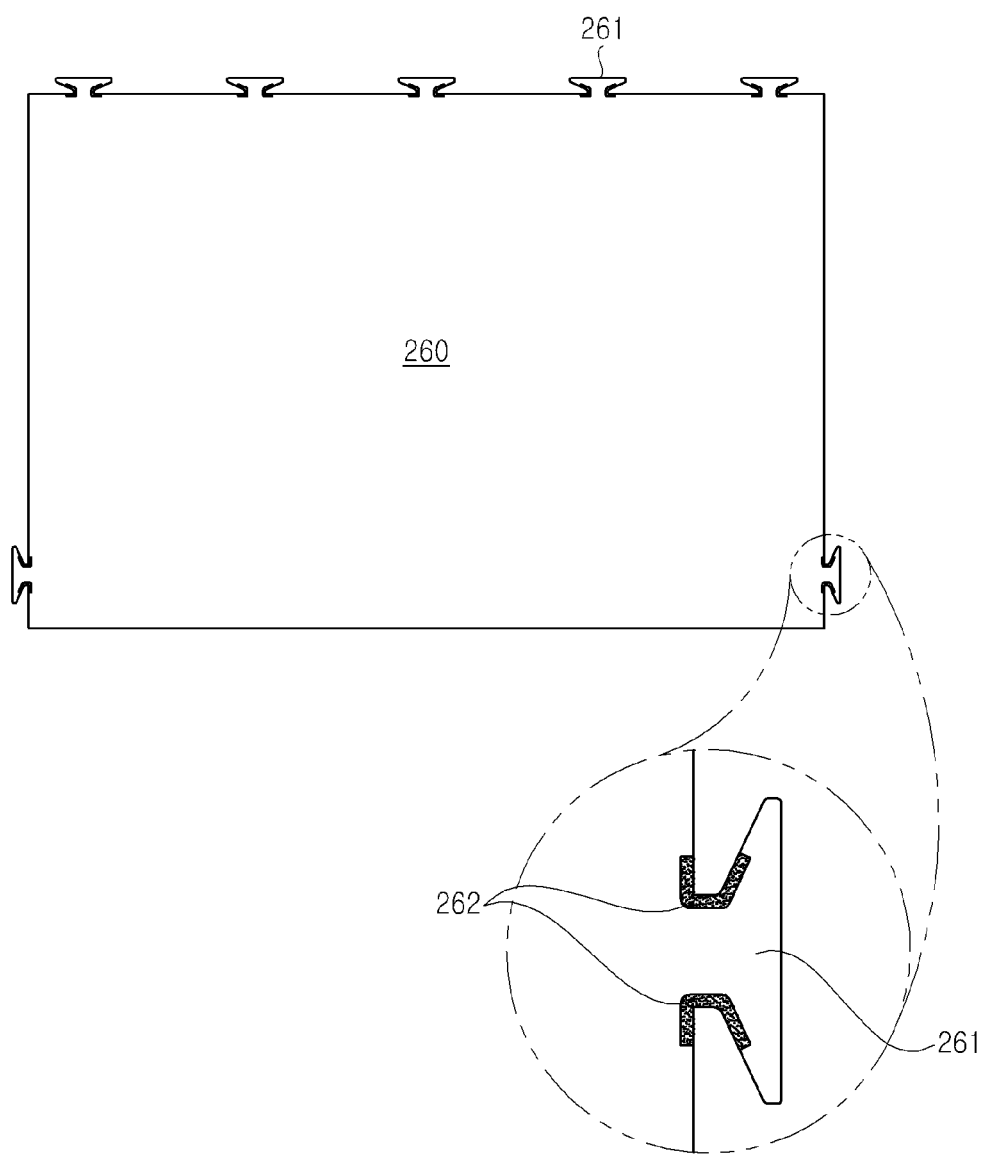
FIG. 5 is an exemplary view illustrating a structure of an optical sheet applied to a backlight unit of an LCD device according to a first embodiment of the present invention.

FIG. 5 is an exemplary view illustrating a structure of an optical sheet applied to a backlight unit 200 according to a first embodiment of the present invention.

The backlight unit 200 according to the first embodiment of the present invention, as described above with reference to FIG. 4, includes: the light guide panel 210; the light source part 220 that is disposed at a side of the light guide panel 210 to emit the light; an optical sheet 260 that is disposed at a front surface of the light guide panel 210 to change a traveling direction of the light, transferred from the light guide panel 210, to a direction vertical to the light guide panel 210; the guide panel 230 that is separated from an end of the optical sheet 260, and guides the light guide panel 210, the light source part 220, and the optical sheet 260; a reflector 280 that is disposed at a rear surface of the light guide panel 210 to reflect the light, transferred through the light guide panel 210, toward the front surface of the light guide panel 210; and a cover bottom 250 that is coupled to the guide panel 230 and a side reflector (not shown) adhered to a side of the light guide panel 210, and in which the reflector 280 is disposed.

In the backlight unit 200 according to the first embodiment of the present invention, except for the optical sheet 260, structures and functions of the light guide panel 210, light source part 220, guide panel 230, reflector 280, side reflector, and cover bottom 250 are the same as the structures and functions described above with reference to FIG. 4. Therefore, descriptions on the elements are not repeated.

The optical sheet 260 diffuses the light passing through the light guide panel 210, or allows the light, passing through the light guide panel, to be vertically incident on the liquid crystal panel 100. The optical sheet 260 may include a diffuser sheet and a prism sheet. The optical sheet 260 may include at least one or more sheets.

The optical sheet 260 is disposed at the front surface of the light guide panel 210 to change a traveling direction of the light, transferred from the light guide panel 210, to a direction vertical to the light guide panel 210.

The end of the optical sheet 260 is disposed on the light guide panel 210 to be separated from the guide panel 230 by a certain interval. The end of the optical sheet 260 is not covered by the guide panel 230, and is disposed at the front surface of the light guide panel 210 to be separated from an end of the guide panel 230 by a certain interval.

At least two or more catching parts 261 are formed at the optical sheet 260 in order for the optical sheet 260 to be fixed to an inner side of the guide panel 230 and the cover bottom 250.

The catching part 261 is caught on a catching jaw (not shown) which is formed at the cover bottom 250 or the guide panel 230, and thus, the optical sheet 260 is fixed to the inner side of the guide panel 230 and the cover bottom 250.

At least two or ore catching parts 261, as illustrated in FIG. 5, are provided on the optical sheet 260. For example, the LCD device according to an embodiment of the present invention equipped with the optical sheet 260 is uprightly used as illustrated in FIG. 5, and thus, the catching part 261 is provided in plurality on the optical sheet 260.

In one example, at least one or more catching parts 261 are provided at left and right sides of the optical sheet 260. As such, when the optical sheet 260 is equipped in the LCD device and is upright as illustrated in FIG. 5, left and right contortion of the optical sheet 260 can be prevented by the catching part 261.

In this case, a lower end of the optical sheet 260 is adjacent to the light source part 220, and thus, the catching part 261 is not formed at the lower end of the optical sheet 260.

As illustrated in FIG. 5, a catching part light absorbing material 262 is coated on a periphery of the catching part 261 which is formed at the optical sheet 260.

As described above in the background art, light leakage or light bounce which occurs through a gap between the guide panel 230 and the optical sheet 260 severely occurs near the catching part 261. Therefore, in the first embodiment of the present invention, the catching part light absorbing material 262 is coated on the periphery of the catching part 261.

The optical sheet 260, as described above, includes at least two or more sheets. In this case, the catching part light absorbing material 262 may be coated on only one or all of the at least two or more sheets.

The catching part light absorbing material 262 may block or scatter light which is leaked through the gap, thereby preventing the light leakage or the light bounce. To this end, the catching part light absorbing material 262 may be formed of a black ink, and coated near the catching part 261. Alternatively, the catching part light absorbing material 262 may be formed of a black tape, and coated near the catching part 261.

Figure 6:
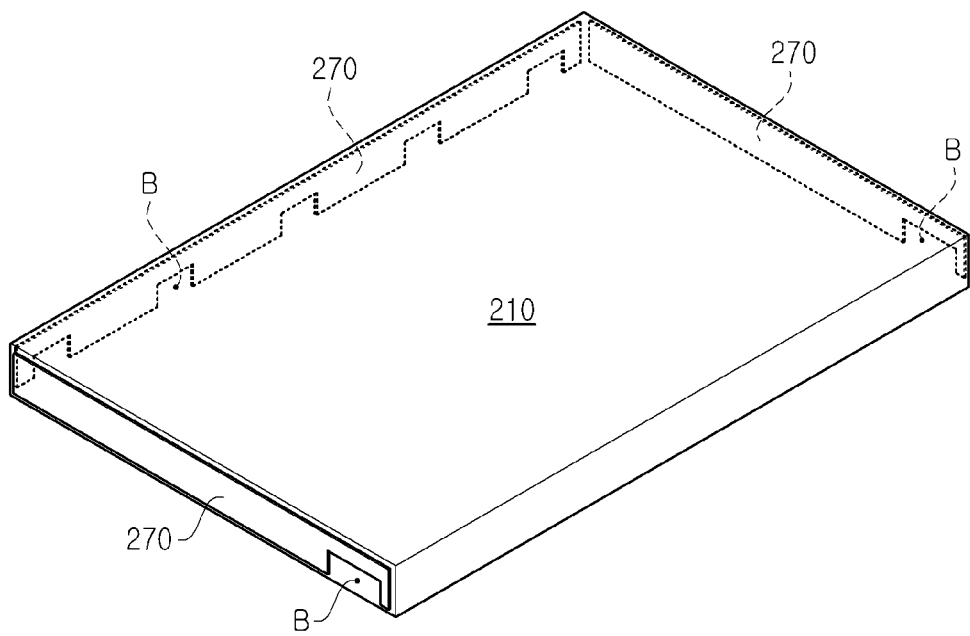
FIG. 6 is an exemplary view illustrating a structure of a light guide panel and a side reflector applied to a backlight unit of an LCD device according to a second embodiment of the present invention.

FIG. 6 is an exemplary view illustrating a structure of a light guide panel and a side reflector applied to a backlight unit 200 according to a second embodiment of the present invention.

The backlight unit 200 according to the second embodiment of the present invention, as described above with reference to FIG. 4, includes: the light guide panel 210; the light source part 220 that is disposed at a side of the light guide panel 210 to emit the light; an optical sheet 260 that is disposed at a front surface of the light guide panel 210 to change a traveling direction of the light, transferred from the light guide panel 210, to a direction vertical to the light guide panel 210; the guide panel 230 that is separated from an end of the optical sheet 260, and guides the light guide panel 210, the light source part 220, and the optical sheet 260; a reflector 280 that is disposed at a rear surface of the light guide panel 210 to reflect the light, transferred through the light guide panel 210, toward the front surface of the light guide panel 210; and a cover bottom 250 that is coupled to the guide panel 230 and a side reflector 270 adhered to a side of the light guide panel 210, and in which the reflector 280 is disposed.

In backlight unit 200 according to the second embodiment of the present invention, except for the side reflector 270, structures and functions of the light guide panel 210, light source part 220, guide panel 230, reflector 280, optical sheet 260, and cover bottom 250 are the same as the structures and functions described above with reference to FIG. 4. Therefore, descriptions on the elements are not repeated.

The side reflector 270, as illustrated in FIG. 6, may be adhered to each of three sides except a side (which faces the light source part 220) among four sides of the light guide panel 210. Among the sides of the light guide panel 210 illustrated in FIG. 6, the side to which the side reflector 270 is not adhered is adjacent to the light source part 220.

The side reflector 270 reflects light (which is emitted from the light source part 220, input to the light guide panel 210, and transferred toward the side of the light guide panel 210) to the inside of the light guide panel 210. The light, which is reflected to the inside of the light guide panel 210 by the side reflector 270, is reflected and scattered by the reflector 280 and patterns which are formed in the light guide panel 210, and transferred toward the optical sheet 260.

A region of the side reflector 270, corresponding to a catching part 261 formed at the optical sheet 260, is cut.

That is, as illustrated in FIG. 5, a plurality of the catching parts 261 are formed at an outer portion of the optical sheet 260. A region B of the side reflector 270 corresponding to the catching part 261 is cut as illustrated in FIG. 6.

For example, when five the catching parts 261 are formed at an upper end of the optical sheet 260 as illustrated in FIG. 5, as illustrated in FIG. 6, five cut regions B are formed at the side reflector 270 which is adhered to an upper side of the light guide panel 210.

Moreover, when one the catching part 261 is formed at each of the left and right sides of the optical sheet 260, one cut region B is formed at the side reflector 270 which is adhered to each of the left and right sides of the light guide panel 210.

Light, which is transferred to a region corresponding to the cut region B of the side reflector 270 among the sides of the light guide panel 210, is output to the outside of the light guide panel 210 through the cut region B.

Therefore, the amount of light reflected to the inside of the light guide panel 210 by the side reflector 270 is small around the cut region B. Therefore, the amount of light (which is reflected from the side of the light guide panel 210 and travels toward the gap between the guide panel 230 and the optical sheet 260) is reduced.

Since the side reflector 270 is cut in the region B of the side reflector 270 corresponding to the catching part 261, the amount of light reflected to the gap between the guide panel 230 and the optical sheet 260) is reduced. Therefore, the light leakage or the light bounce is considerably reduced around the catching part 261.

Figure 7:
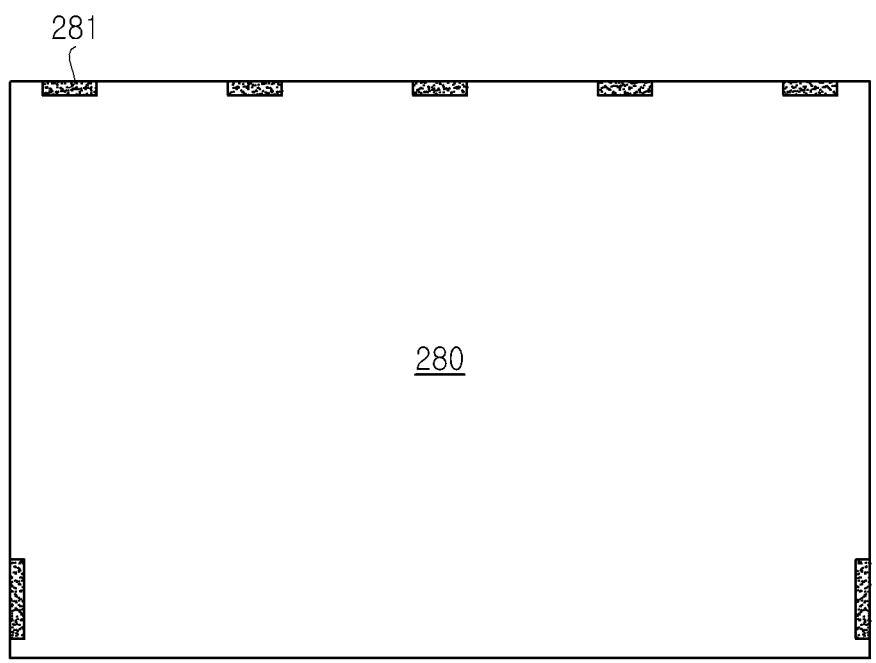
FIG. 7 is an exemplary view illustrating a structure of a reflector applied to a backlight unit of an LCD device according to a third embodiment of the present invention.

FIG. 7 is an exemplary view illustrating a structure of a reflector applied to a backlight unit 200 according to a third embodiment of the present invention.

The backlight unit 200 according to the third embodiment of the present invention, as described above with reference to FIG. 4, includes: the light guide panel 210; the light source part 220 that is disposed at a side of the light guide panel 210 to emit the light; an optical sheet 260 that is disposed at a front surface of the light guide panel 210 to change a traveling direction of the light, transferred from the light guide panel 210, to a direction vertical to the light guide panel 210; the guide panel 230 that is separated from an end of the optical sheet 260, and guides the light guide panel 210, the light source part 220, and the optical sheet 260; a reflector 280 that is disposed at a rear surface of the light guide panel 210 to reflect the light, transferred through the light guide panel 210, toward the front surface of the light guide panel 210; and a cover bottom 250 that is coupled to the guide panel 230 and a side reflector 270 adhered to a side of the light guide panel 210, and in which the reflector 280 is disposed.

In the backlight unit 200 according to the second embodiment of the present invention, except for the reflector 280, structures and functions of the light guide panel 210, light source part 220, guide panel 230, side reflector 270, optical sheet 260, and cover bottom 250 are the same as the structures and functions described above with reference to FIG. 4. Therefore, descriptions on the elements are not repeated.

The reflector 280 is disposed at the rear surface of the light guide panel 210, and reflects the light (which is emitted from the light source part 220, is input to the light guide panel 210 through the side of the light guide panel 210, and travels toward the rear surface of the light guide panel 210) toward the liquid crystal panel 100.

The light, which is emitted from the light source part 220 and input to the light guide panel 210, is refracted by a pattern formed at the light guide panel 210, and is reflected toward the liquid crystal panel 100. However, some of the light may be leaked to the outside through the rear surface of the light guide panel 210 without being reflected, and thus, the reflector 280 reflects the leaked light to induce the leaked light toward the liquid crystal panel 100.

The reflector 280 may be guided by the guide panel 230 or the cover bottom 250, and mounted on the cover bottom 250. A reflector light absorbing material is coated on a region of the reflector 280 corresponding to the gap between the guide panel 230 and the optical sheet 260. In particular, the reflector light absorbing material is coated on a region of the reflector 280 corresponding to the catching part 261 which is formed at the optical sheet 260.

That is, as illustrated in FIG. 5, a plurality of the catching parts 261 are formed at an outer portion of the optical sheet 260. As illustrated in FIG. 6, the reflector light absorbing material is formed in a region of the reflector 280 corresponding to the catching part 261.

For example, when five the catching parts 261 are formed at the upper end of the optical sheet 260 as illustrated in FIG. 5, as illustrated in FIG. 7, five the reflector light absorbing materials are formed at an upper end of the reflector 280.

Moreover, when one the catching part 261 is formed at each of left and right sides of the optical sheet 260, one the reflector light absorbing material is formed at each of left and right sides of the reflector 280.

Light, which is transferred to a region of the reflector 280 in which the reflector light absorbing material is formed, is absorbed or scattered by the reflector light absorbing material.

Therefore, the amount of light reflected to the inside of the light guide panel 210 is small around the reflector light absorbing material. Therefore, the amount of light (which is reflected from the reflector light absorbing material and travels toward the gap between the guide panel 230 and the optical sheet 260) is reduced.

That is, the amount of light which is reflected from the gap between the guide panel 230 and the optical sheet 260 is reduced in a region of the reflector 280 in which the reflector light absorbing material is formed. Accordingly, the light leakage or the light bounce is considerably reduced around the catching part 261.

The reflector light absorbing material may block or scatter light which is transferred through the bottom of the light guide panel 210, thereby preventing the light leakage or the light bounce. To this end, the reflector light absorbing material may be formed of a black ink, and coated near the catching part 261 in the reflector 280. Alternatively, the reflector light absorbing material may be formed of a black tape, and adhered to a periphery of the catching part 261 in the reflector 280.

Hereinafter, another embodiment of the present invention will be described in detail with reference to FIGS. 4 to 8.

Figure 8:
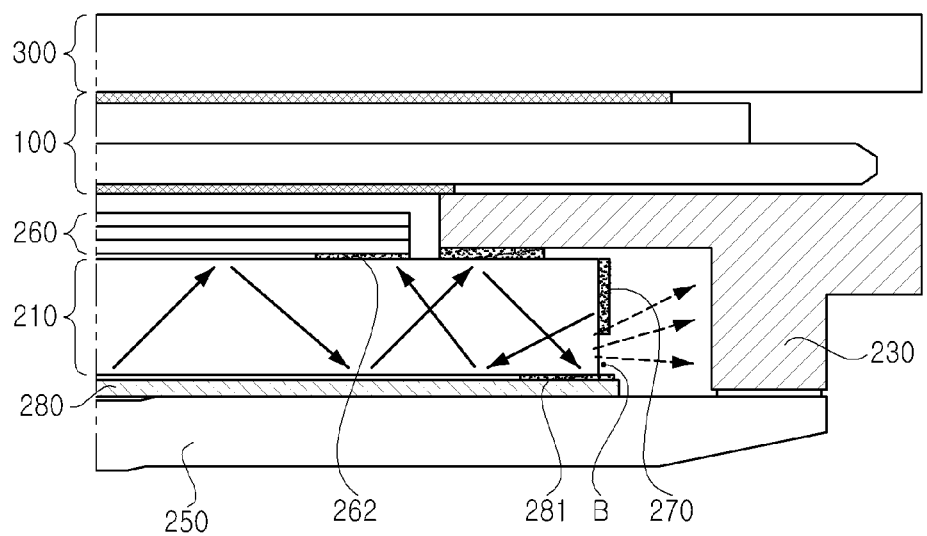
FIG. 8 is an exemplary view illustrating a cross-sectional view of an LCD device according to an embodiment of the present invention.

FIG. 8 is an exemplary view illustrating a cross-sectional view of an LCD device according to an embodiment of the present invention. The first to third embodiments are all applied to the LCD device according to an embodiment of the present invention illustrated in FIG. 8.

As described above, the LCD device according to an embodiment of the present invention includes the backlight unit 200, the liquid crystal panel 100 which is disposed on the backlight unit 200 to display an image, and the tempered glass 300 which is adhered to the front surface of the liquid crystal panel 100. The backlight unit 200 according to an embodiment of the present invention includes: the light guide panel 210; the light source part 220 that is disposed at the side of the light guide panel 210 to emit the light; the optical sheet 260 that is disposed at the front surface of the light guide panel 210 to change the traveling direction of the light, transferred from the light guide panel 210, to the direction vertical to the light guide panel 210; the guide panel 230 that is separated from the end of the optical sheet 260, and guides the light guide panel 210, the light source part 220, and the optical sheet 260; the reflector 280 that is disposed at the rear surface of the light guide panel 210 to reflect the light, transferred through the light guide panel 210, toward the front surface of the light guide panel 210; and the cover bottom 250 that is coupled to the guide panel 230 and the side reflector (not shown) adhered to the side of the light guide panel 210, and in which the reflector 280 is disposed.

A fourth embodiment of the present invention is implemented by combining the first and second embodiments. That is, in the first embodiment of the present invention, the catching part light absorbing material 262 is coated on the optical sheet 260, and in the second embodiment of the present invention, a portion of the side reflector 270 adhered to the side of the light guide panel 210 is cut. In a backlight unit 200 according to the fourth embodiment of the present invention, the catching part light absorbing material 262 is coated on the optical sheet 260, and a region B of the side reflector 270 corresponding to the catching part 261 which is formed at the optical sheet 260 is cut.

To provide an additional description, the backlight unit and LCD device according to the fourth embodiment of the present invention include the optical sheet 260 described above with reference to FIG. 5 and the side reflector 270 described above with reference to FIG. 6.

A fourth embodiment of the present invention can be implemented by combining the first and third embodiments. For example, in the first embodiment of the present invention, the catching part light absorbing material 262 is coated on the optical sheet 260, and in the third embodiment of the present invention, the reflector light absorbing material is coated on the outer portion of the reflector 280. In a backlight unit 200 according to the fifth embodiment of the present invention, the catching part light absorbing material 262 is coated on the optical sheet 260, and the reflector light absorbing material is coated on the outer portion of the reflector 280.

To provide an additional description, the backlight unit and LCD device according to the fifth embodiment of the present invention include the optical sheet 260 described above with reference to FIG. 5 and the reflector 280 described above with reference to FIG. 7.

A sixth embodiment of the present invention can be implemented by combining the second and third embodiments. In the second embodiment of the present invention, a portion of the side reflector 270 adhered to the side of the light guide panel 210 is cut, and in the third embodiment of the present invention, the reflector light absorbing material is coated on the outer portion of the reflector 280. In a backlight unit 200 according to the sixth embodiment of the present invention, a portion of the side reflector 270 adhered to the side of the light guide panel 210 is cut, and the reflector light absorbing material is coated on the outer portion of the reflector 280.

To provide an additional description, the backlight unit and LCD device according to the sixth embodiment of the present invention include the side reflector 270 described above with reference to FIG. 6 and the reflector 280 described above with reference to FIG. 7.

A seventh embodiment of the present invention can be implemented by combining the first to third embodiments. For example, in the first embodiment of the present invention, the catching part light absorbing material 262 is coated on the optical sheet 260, and in the second embodiment of the present invention, a portion of the side reflector 270 adhered to the side of the light guide panel 210 is cut. Also, in the third embodiment of the present invention, the reflector light absorbing material is coated on the outer portion of the reflector 280. In a backlight unit 200 according to the seventh embodiment of the present invention, the catching part light absorbing material 262 is coated on the optical sheet 260, a portion of the side reflector 270 adhered to the side of the light guide panel 210 is cut, and the reflector light absorbing material is coated on the outer portion of the reflector 280.

To provide an additional description, the backlight unit and LCD device according to the seventh embodiment of the present invention include the optical sheet 260 described above with reference to FIG. 5, the side reflector 270 described above with reference to FIG. 6, and the reflector 280 described above with reference to FIG. 7.

According to the embodiments of the present invention, light is prevented from being leaked or bouncing through the gap between the guide panel and the optical sheet, and thus, a quality of an image displayed by the LCD device can be improved.

Moreover, according to the embodiments of the present invention, a process of testing light leakage is not performed, thereby reducing the manufacturing cost.

Moreover, according to the embodiments of the present invention, a defect rate caused by light leakage can be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit comprising:
   a light guide panel;
   a light source part disposed at a side of the light guide panel to emit a light;
   an optical sheet disposed at a front surface of the light guide panel;
   a guide panel separated from an end of the optical sheet, and configured to guide the light guide panel, the light source part, and the optical sheet;
   a catching part protruded from the optical sheet, the catching part being engaged with the guide panel;
   a catching part light absorbing material coated on a periphery of the catching part to prevent a light leakage or a light bounce from occurring through a gap between the guide panel and the optical sheet;
   a reflector disposed at a rear surface of the light guide panel;
   a side reflector adhered to a side of the light guide panel; and
   a cover bottom coupled to the guide panel, and in which the reflector is disposed,
   wherein the catching part light absorbing material includes a black ink or a black tape.

2. The backlight unit of claim 1, wherein a region of the side reflector, corresponding to the catching part is cut.

3. The backlight unit of claim 1, wherein a reflector light absorbing material is coated on an upper surface of the reflector corresponding to the catching part.

4. A backlight unit comprising:
   a light guide panel;
   a light source part disposed at a side of the light guide panel to emit a light;
   an optical sheet disposed at a front surface of the light guide panel;
   a guide panel separated from an end of the optical sheet, and configured to guide the light guide panel, the light source part, and the optical sheet;
   a catching part protruded from the optical sheet, the catching part being engaged with the guide panel;
   a catching part light absorbing material coated on an upper surface of the catching part to prevent a light leakage or a light bounce from occurring through a gap between the optical sheet and the guide panel;
   a reflector disposed at a rear surface of the light guide panel;
   a side reflector adhered to a side of the light guide panel; and
   a cover bottom coupled to the guide panel, and in which the reflector is disposed,
   wherein a reflector light absorbing material is coated on an upper surface of the reflector corresponding to the gap between the guide panel and the optical sheet, and
   wherein the reflector light absorbing material includes a black ink or a black tape.

5. The backlight unit of claim 4, wherein the reflector light absorbing material is coated on the upper surface of the reflector corresponding to the catching part protruded from the optical sheet.

6. The backlight unit of claim 4, wherein a region of the side reflector, corresponding to the catching part protruded from the optical sheet, is cut.

7. A liquid crystal display (LCD) device comprising:
   a backlight unit;
   a liquid crystal panel disposed on the backlight unit to display an image; and
   a tempered glass adhered to a front surface of the liquid crystal panel,
   wherein the backlight unit comprises:
      a light guide panel;
      a light source part disposed at a side of the light guide panel to emit a light;
      an optical sheet disposed at a front surface of the light guide panel;
      a guide panel separated from an end of the optical sheet, and configured to guide the light guide panel, the light source part, and the optical sheet;
      a catching part protruded from the optical sheet, the catching part being engaged with the guide panel;
      a catching part light absorbing material coated on a periphery of the catching part to prevent a light leakage or a light bounce from occurring through a gap between the optical sheet and the guide panel;
      a reflector disposed at a rear surface of the light guide panel;
      a side reflector adhered to a side of the light guide panel; and
      a cover bottom coupled to the guide panel, and in which the reflector is disposed,
      wherein the catching part light absorbing material includes a black ink or a black tape.

8. The LCD device of claim 7, wherein,
a reflector light absorbing material is coated on an upper surface of the reflector corresponding to the catching part,
a region of the side reflector, corresponding to the catching part, is cut.

9. The backlight unit of claim 3, wherein the reflector light absorbing material includes a black ink or a black tape.

10. The backlight unit of claim 4, wherein the catching part light absorbing material includes a black ink or a black tape.

11. The LCD device of claim 8, wherein the reflector light absorbing material includes a black ink or a black tape.

\* \* \* \* \*